United States Patent
Roos et al.

(10) Patent No.: US 8,413,423 B2
(45) Date of Patent: Apr. 9, 2013

(54) CATALYST TEMPERATURE CONTROL SYSTEMS AND METHODS FOR HYBRID VEHICLES

(75) Inventors: Bryan Nathaniel Roos, Novi, MI (US); Brian Spohn, Holly, MI (US); Halim G. Santoso, Novi, MI (US); Eugene V. Gonze, Pinckney, MI (US)

(73) Assignee: GM Global Technologies Operations LLC

( * ) Notice: Subject to any disclaimer, the term of this patent is extended or adjusted under 35 U.S.C. 154(b) by 287 days.

(21) Appl. No.: 12/551,859

(22) Filed: Sep. 1, 2009

(65) Prior Publication Data

US 2011/0047981 A1 Mar. 3, 2011

(51) Int. Cl.
*F01N 3/00* (2006.01)
(52) U.S. Cl.
USPC ............ 60/284; 60/300; 60/303; 180/65.265
(58) Field of Classification Search .................. 60/284, 60/300, 303; 180/65.265, 65.28, 62.285
See application file for complete search history.

(56) References Cited

U.S. PATENT DOCUMENTS

| | | | |
|---|---|---|---|
| 5,257,501 A | 11/1993 | Wataya | |
| 5,785,138 A * | 7/1998 | Yoshida | 180/65.245 |
| 6,057,605 A * | 5/2000 | Bourne et al. | 290/40 C |
| 6,394,209 B1 * | 5/2002 | Goehring et al. | 180/65.245 |
| 6,820,471 B2 * | 11/2004 | Ito | 73/114.68 |
| 7,077,224 B2 * | 7/2006 | Tomatsuri et al. | 180/65.235 |
| 7,603,227 B2 * | 10/2009 | Watanabe et al. | 701/113 |
| 2006/0278449 A1 * | 12/2006 | Torre-Bueno | 180/65.2 |
| 2010/0192122 A1 | 7/2010 | Esfahan et al. | |
| 2010/0205939 A1 * | 8/2010 | Sano et al. | 60/276 |
| 2011/0047980 A1 | 3/2011 | Santoso et al. | |

FOREIGN PATENT DOCUMENTS

| | | |
|---|---|---|
| DE | 4100133 A1 | 7/1992 |
| DE | 4231711 A1 | 8/1993 |
| WO | WO2007107135 A1 | 11/2007 |

OTHER PUBLICATIONS

U.S. Appl. No. 12/392,438, filed Feb. 25, 2009, Bryan Nathaniel Roos.
U.S. Appl. No. 12/423,409, filed Apr. 14, 2009, Halim G. Santoso.
U.S. Appl. No. 12/481,957, filed Jun. 10, 2009, Halim G. Santoso.
U.S. Appl. No. 12/537,373, filed Aug. 7, 2009, Eugene V. Gonze.
U.S. Appl. No. 12/537,384, filed Aug. 7, 2009, Eugene V. Gonze.
Office Action dated Mar. 30, 2012 from the German Patent Office for German Patent Application No. 10 2010 035 480.5; 6 pages.

* cited by examiner

*Primary Examiner* — Thomas Denion
*Assistant Examiner* — Matthew T Largi

(57) ABSTRACT

A catalyst temperature control system of the present disclosure includes a vehicle start anticipation module and an electrically heated catalyst (EHC) control module. The vehicle start anticipation module determines whether a vehicle start is anticipated based on at least one of a plurality of vehicle conditions before an ignition switch is turned on. The EHC control module activates an EHC based on the determination.

11 Claims, 5 Drawing Sheets

CATALYST TEMPERATURE CONTROL SYSTEMS AND METHODS FOR HYBRID VEHICLES

FIELD

The present disclosure relates generally to emission controls for automotive vehicles and, more particularly, to catalyst temperature control systems and methods for hybrid vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Catalytic converters are used with internal combustion engines to reduce emissions. The catalytic converters generally operate more efficiently at elevated temperatures. When an engine is started, the catalytic converter may not be efficient in removing emissions from the exhaust gas until the catalytic converter reaches an operating temperature (e.g., a "light-off temperature"). The light-off temperature may be a temperature where the conversion of carbon monoxide (CO), unburned hydrocarbons (HC), and nitride oxides ($NO_x$) has reached 50% efficiency.

During engine cold start, a rich fuel air mixture may be supplied to the engine to increase the exhaust temperature and the exhaust gas may be used to heat the catalytic converter. Therefore, the engine is not operated in a fuel-efficient manner during engine start. An electrically heated catalyst (EHC) may be activated during engine start to provide extra heat to the catalytic converter. The EHC, however, has a slow response and may not be able to quickly heat the catalytic converter as desired.

SUMMARY

A catalyst temperature control system of the present disclosure includes a vehicle start anticipation module and an electrically heated catalyst (EHC) control module. The vehicle start anticipation module determines whether a vehicle start is anticipated based on at least one of a plurality of vehicle conditions before an ignition switch is turned on. The EHC control module activates an EHC based on the determination.

In a feature, the plurality of vehicle conditions include at least one of status of vehicle doors, status of door locks, status of a vehicle trunk, presence of a driver in a vehicle, detection of a key fob, and insertion of a key in an ignition switch.

In other features, when a vehicle door is unlocked and a person's presence in a vehicle is not detected, the EHC generates a first heat output. When a person's presence in the vehicle is detected, the EHC generates a second heat output that is higher than the first heat output.

A method of controlling catalyst temperature according to the present disclosure includes: determining whether a vehicle start is anticipated based on at least one of a plurality of vehicle conditions before an ignition switch is turned on; and activating an electrically heated catalyst (EHC) based on the determination.

The catalyst temperature control system and method of the present disclosure anticipate a vehicle start and utilizes the EHC to heat the catalyst of a catalytic converter based on the anticipation. The catalytic converter is heated by the EHC before an engine start. Therefore, engine cold start emissions are reduced and vehicle fuel economy is improved.

In addition, the catalyst temperature control system and method of the present disclosure maintain the catalyst temperature at or above a light-off temperature after the vehicle start by utilizing the EHC in various vehicle modes of operation. Therefore, the overall emissions output of the vehicle is reduced and the vehicle fuel economy is improved.

Further areas of applicability of the present disclosure will become apparent from the detailed description provided hereinafter. It should be understood that the detailed description and specific examples are intended for purposes of illustration only and are not intended to limit the scope of the disclosure.

DRAWINGS

The present disclosure will become more fully understood from the detailed description and the accompanying drawings, wherein.

DETAILED DESCRIPTION

Figure 1:
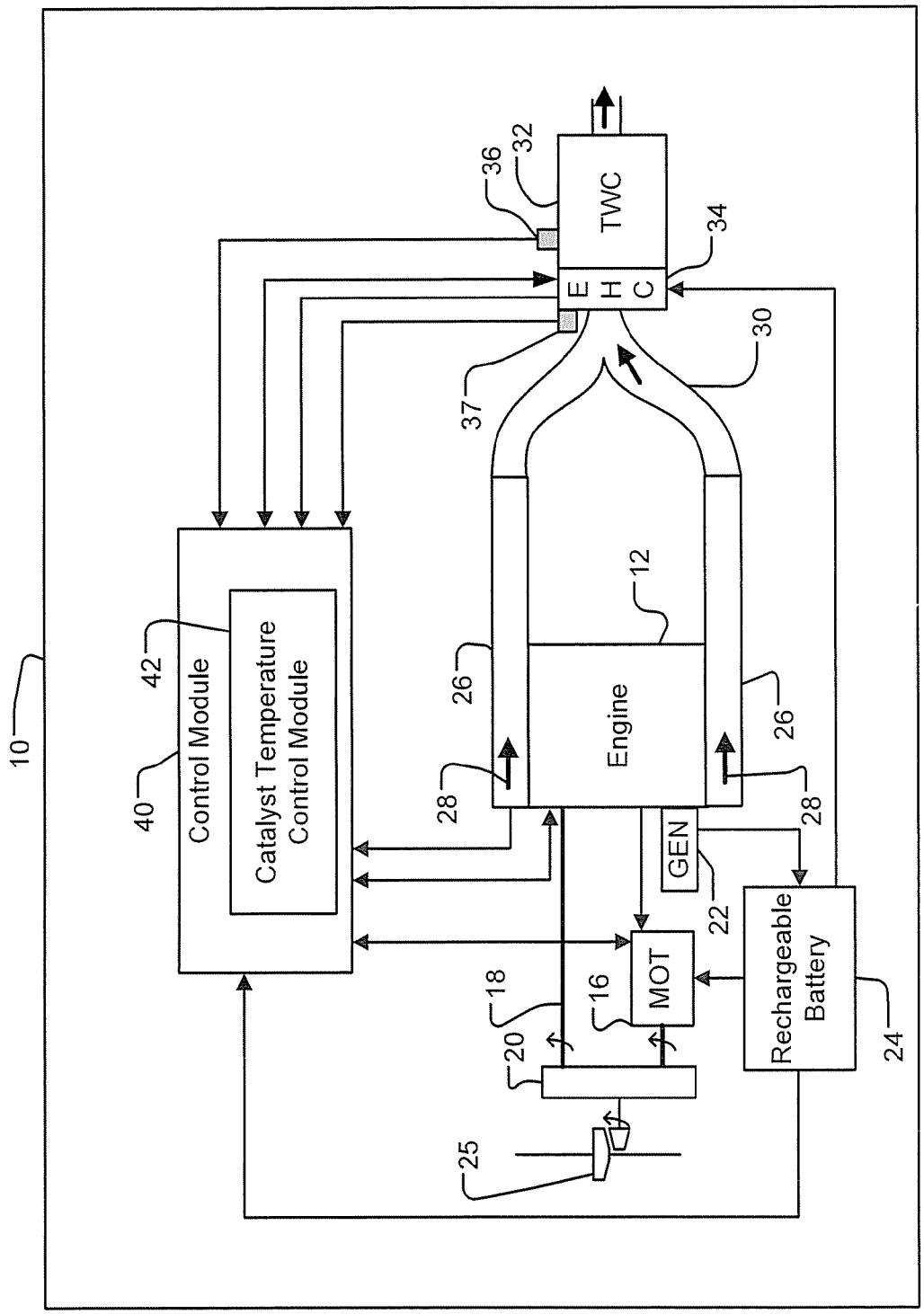
FIG. 1 is a functional block diagram of an exemplary hybrid vehicle that includes a catalyst temperature control module according to the teachings of the present disclosure.

The following description is merely exemplary in nature and is in no way intended to limit the disclosure, its application, or uses. For purposes of clarity, the same reference numbers will be used in the drawings to identify similar elements. As used herein, the term "module" refers to an Application Specific Integrated Circuit (ASIC), an electronic circuit, a processor (shared, dedicated, or group) and memory that execute one or more software or firmware programs, and/or a combinational logic circuit.

A catalyst temperature control module according to the present disclosure determines whether a vehicle start is anticipated based on vehicle conditions. The vehicle conditions include, but are not limited to, a locking status of a vehicle door lock, a closed status of a vehicle door and a vehicle trunk, presence of a person in a vehicle, detection of a key fob within a predetermined distance of the vehicle, and insertion of a key in an ignition switch. When the vehicle start is anticipated, the catalyst temperature control module activates an electrically heated catalyst (EHC) to heat a three-way catalytic converter (TWC) before an ignition switch is turned on. Therefore, the engine cold start period is shortened, excessive emissions during the engine cold start period are reduced, and fuel economy is improved.

Referring now to FIG. 1, a hybrid vehicle 10 includes an engine 12 and an electric motor 16. The engine 12 is connected to an output shaft 18 that provides rotational power to a transmission 20. A generator 22 is driven by the engine 12 and provides charging current to a rechargeable battery 24. The electric motor 16 may also function as a generator to produce electrical energy to be used by vehicle electrical systems and/or be stored in the battery 24. The electric motor 16 converts electric power from the battery 24 to mechanical power. The mechanical power is applied to an input shaft of the transmission 20. The transmission 20 combines power from the engine 12 and the electric motor 16 to provide power to a drive axle 25. The engine 12 and the electric motor 16 may provide propulsion simultaneously or independently.

The hybrid vehicle 10 may be a plug-in hybrid electric vehicle (PHEV) with batteries that can be recharged by connecting a plug to an external electric power source (not shown). The PHEV generally operates in a charge-depleting (CD) mode at startup and switches to a charge-sustaining (CS) mode when the battery reaches its minimum state of charge (SOC). SOC is defined as the percentage of the full capacity of a battery that is available for further discharge.

In the CD mode, the vehicle operation is dependent on energy from the battery 24 with a net decrease in the SOC. In the CS mode, the SOC is low and both the engine 12 and the battery 24 supply power to the hybrid vehicle 10. In the CS mode, the hybrid vehicle 10 is operated as efficiently as possible without allowing the SOC of the battery 24 to move outside a predetermined narrow range.

In addition to the CD and CS modes, the hybrid vehicle 10 may be operated in a charge increase (CI) mode, where the vehicle operation is dependent on energy from the engine 12 and the battery 24 is being charged. Additionally, the PHEV may be operated in a blended mode, where the engine 12 supplements the battery 24 during medium to heavy loads.

The engine 12 is connected to an exhaust manifold 26. The exhaust manifold 26 directs exhaust gas 28 from the engine 12 through an exhaust pipe 30 to a catalytic converter. For example only, the catalytic converter may be a three-way catalytic converter (TWC) 32. An electrically heated catalyst (EHC) 34 is mounted at an inlet end of the TWC 32. The EHC 34 may be a separate assembly from the TWC 32 or integrally formed as a part of the TWC 32.

During engine cold start, as the exhaust gas flows through the TWC 32, the exhaust gas gradually heats the TWC 32 to a light-off temperature. The "light-off temperature" is the temperature where the conversion of carbon monoxide (CO), hydrogen carbons (HC), and nitride oxides ($NO_x$) has reached 50% efficiency. The TWC 32 is primarily heated by the exhaust gas 28 when the engine 12 is running. The EHC 34 is powered by the battery 24 and may be activated to provide extra heat to the TWC 32. In addition, the engine 12 may be operated in a fuel-enriched condition and/or spark retard condition to more quickly increase the temperatures of the exhaust gas and the TWC 32.

A TWC temperature sensor 36 is provided at the TWC 32 to measure the temperature (i.e., the catalyst temperature) of the TWC 32. An EHC temperature sensor 37 is provided at the EHC 34 to measure the temperature of the EHC 34. A control module 40 includes a catalyst temperature control module 42 that controls the temperature of the TWC 32 by regulating a heat output of the EHC 34. The catalyst temperature control module 42 determines whether a vehicle start is anticipated and activates the EHC 34 to heat the TWC 32 before an ignition switch is turned on.

Figure 2:
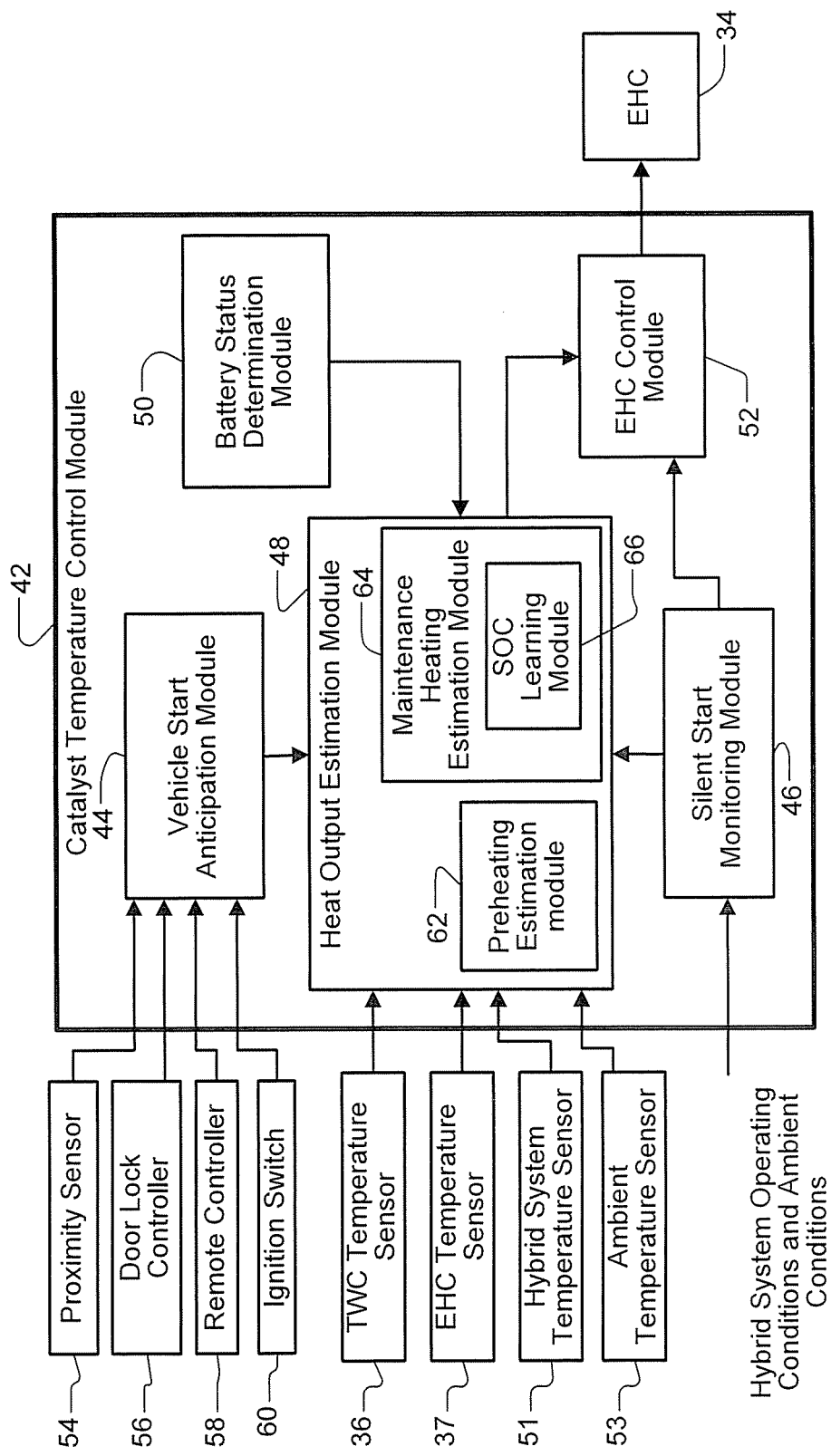
FIG. 2 is a functional block diagram of a catalyst temperature control module according to the teachings of the present disclosure.

Referring to FIG. 2, the catalytic temperature control module 42 includes a vehicle start anticipation module 44, a silent start monitoring module 46, a heat output estimation module 48, a battery status determination module 50, and an EHC control module 52. The vehicle start anticipation module 44 determines whether a vehicle start is anticipated. "Vehicle start" refers to a moment or a vehicle condition when an ignition switch is turned on and a starter motor starts to drive a powertrain. In a non-hybrid vehicle where an engine is started immediately after an ignition switch is turned on, "vehicle start" may be used interchangeably with "engine start." In a hybrid vehicle, however, "vehicle start" may be different from "engine start" because the engine may not be started immediately after the ignition switch is turned on.

The vehicle start anticipation module 44 determines whether a vehicle start is anticipated, for example, based on signals from a proximity sensor 54, a door lock controller 56, a remote controller 58, and/or an ignition switch 60. The proximity sensor 54 may be provided at a driver's seat to detect presence of a driver. Alternatively, the proximity sensor 54 may detect a presence of a key fob within a predetermined distance of the vehicle.

In other words, the vehicle start anticipation module 44 anticipates a vehicle start based on vehicle conditions, including, but not limited to, locking and unlocking statuses of a vehicle door lock, opening and closing statues of a vehicle door and/or a vehicle trunk, presence or absence of a driver in the vehicle 10, detection of a key fob within a predetermined distance of the vehicle, and/or insertion of a key in the ignition switch 60. For example only, a vehicle start may be anticipated when a vehicle door is open, when a trunk is open, when a vehicle door is unlocked, when a driver's presence in a driver's seat is detected, or when a key is inserted in an ignition switch. By monitoring the statuses of the vehicle door(s), trunk, insertion of the key in the ignition switch, or the driver's presence in the vehicle, the vehicle start anticipation module 44 determines that a vehicle start is anticipated.

The silent start monitoring module 46 monitors hybrid system operating conditions and ambient conditions and determines whether the vehicle 10 is in a silent start capable condition. "Silent start capable" condition refers to a condition where the engine 12 will not be started immediately after a key is inserted in the ignition switch 60 to turn on the ignition switch 60. The vehicle 10 can be driven solely by electric power from the battery 24. For example, the silent start capable condition may be similar to a vehicle condition under an auto-stop. In contrast, when the vehicle 10 is not in a silent start capable condition, the vehicle 10 cannot be driven solely by electric power. The engine 12 will be started immediately after the ignition switch 60 is turned on. For example only, the vehicle 10 may not be in a silent start capable condition when the ambient temperature is low (for example, below −20° C.).

The silent start capable condition of the vehicle 10 determines the preheating temperature (or the preheating output) of the EHC 34. More specifically, the silent start capable condition of the vehicle 10 affects a determination of whether the EHC 34 should utilize a first EHC preheating temperature strategy or a second EHC preheating temperature strategy. When the vehicle 10 is in the silent start capable condition, the engine 12 will not be started immediately after the ignition switch 60 is turned on. The EHC 34 may be powered by the rechargeable battery 24 to heat the TWC 32 before the ignition switch 60 is turned on when the temperature of the TWC 32 is low (for example, below the light-off temperature). Because the engine 12 will not be started immediately after the ignition switch is turned to supply exhaust gas to the TWC 32, the EHC 34 has relatively more time to heat the catalyst of the TWC 32. Therefore, the first EHC preheating temperature strategy is used and the EHC is heated to a first preheating temperature.

When the vehicle 10 is not in the silent start capable condition, the engine 12 will be started immediately after the ignition switch 60 is turned on. The engine 12 will start to generate exhaust gas immediately after the vehicle start. The EHC 34 has relatively less time to heat the catalyst of the TWC 32 to the light-off temperature before the engine start. Due to time constraints associated with heating the EHC, the second EHC preheating temperature strategy is used and the EHC 34 is heated to a second preheating temperature that is higher than the first preheating temperature. Therefore, the EHC 34 is preheated to a higher preheating temperature earlier and is maintained at the higher preheating temperature for a longer period of time. The EHC 34 may be deactivated during the vehicle start to save battery power for a more efficient use after the powertrain is warm.

The battery status determination module 50 determines a state of charge (SOC) of the battery 24. The battery status determination module 50 may generate different signals indicating levels of charge that correspond to different modes of operation, including, but not limited to, CS mode, CD mode and CI mode.

The heat output estimation module 48 estimates the heat output of the EHC 34 to heat the TWC 32 based on the vehicle conditions and the SOC. The heat output estimation module 48 includes a preheating estimation module 62 and a maintenance heating estimation module 64. The preheating estimation module 62 estimates a desired preheating output of the EHC 34 when the TWC 32 has a temperature (i.e., catalyst temperature) lower than the light-off temperature. The heat output estimation module 48 may communicate with the TWC temperature sensor 36, the EHC temperature sensor 36, a hybrid system temperature sensor 51, and an ambient temperature sensor 53. Signals from these temperature sensors 36, 37, 51 and 53 also affect estimation of heat output during the preheating stage or the maintenance heating stage.

Different vehicle conditions indicate different probabilities of a vehicle start. For example, when a trunk or a door is open, a vehicle start may be probable but not imminent. The preheating estimation module 62 estimates a first heat output and the EHC 34 may be powered to a first preheating temperature, for example, 100° C., using the first EHC preheating temperature strategy. When a person's presence in the driver's seat is detected, the vehicle start may be imminent. The preheating estimation module 62 estimates a second heat output and the EHC 34 may be powered to a second preheating temperature, for example, 300° C., using the second EHC preheating temperature strategy. The second preheating output/temperature is higher than the first preheating output/temperature.

The maintenance heating estimation module 64 estimates a desired maintenance heat output of the EHC 34 to maintain the temperature of the TWC 32 at or above the light-off temperature after the TWC 32 has reached the light-off temperature. For example only, after the engine 12 has run for a period and the battery 24 has been charged, the engine 12 may be shut off to reduce fuel consumption. At this instance, the TWC 32 may be at a temperature equal to or above the light-off temperature. After the engine 12 stops supplying the exhaust gas, the TWC 32 may be cooled down. Therefore, after the engine 12 is shut off, the EHC 34 may be activated to heat the TWC 32 and maintain the temperature of the TWC 32 at or above the light-off temperature. The heat output of the EHC 34 for maintenance heating depends on the SOC of the battery. The SOC determines when the engine 12 will be started again.

The maintenance heat estimation module 64 includes an SOC learning module 66 that estimates the maintenance heat output of the EHC 34 based on the SOC. The SOC learning module 66 is activated when the ignition switch 60 is still on but the engine 12 is shut off. The SOC learning module 66 may determine the desired heat output of the EHC 34 and the activation duration of the EHC 34.

For example, when the vehicle 10 is in the CD mode, the vehicle 10 is more likely to use electrical power only for a longer duration between the current engine-off event and the next engine-on event. Therefore, the maintenance heating estimation module 64 estimates a relatively large heat output (i.e., the first maintenance heat output) of the EHC 34. When the vehicle 10 is near a transition point between the CD mode and the CS mode, the maintenance heating estimation module 64 determines a medium level of heat output (i.e., the second maintenance heat output) of the EHC 34. After the vehicle 10 is transitioned to the CS mode, the maintenance heating estimation module 64 estimates a relatively lower level of heat output (i.e., the third maintenance heat output). The first maintenance heat output is greater than the second maintenance heat output. The second maintenance heat output is greater than the third maintenance heat output. The EHC control module 52 activates the EHC 34 and regulates the maintenance heat output of the EHC 34 (for example, by controlling the activation period) accordingly. The sooner the next engine start event, the lower the maintenance heat output.

Figure 3A:
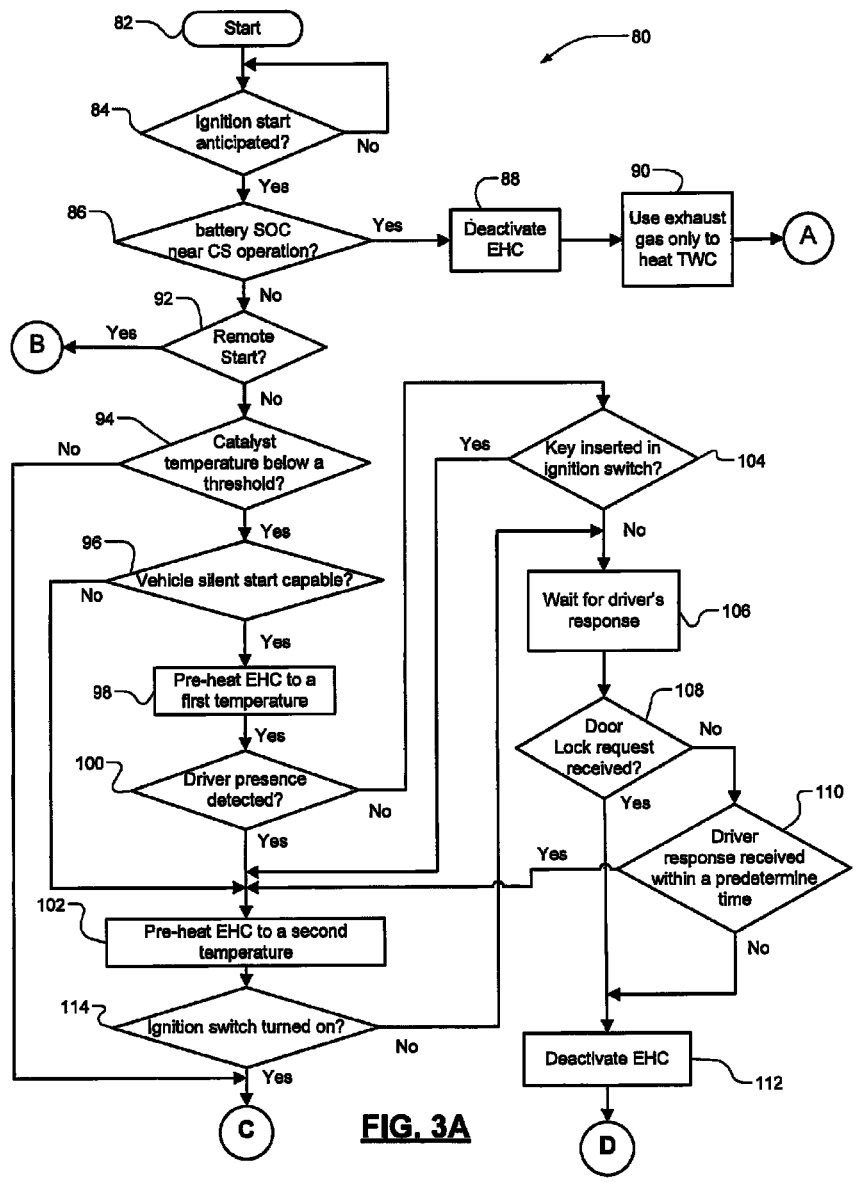
FIGS. 3A, 3B, and 3C are a flow diagram of a method for controlling temperature of a catalytic converter according to the teachings of the present disclosure.
Figure 3B:
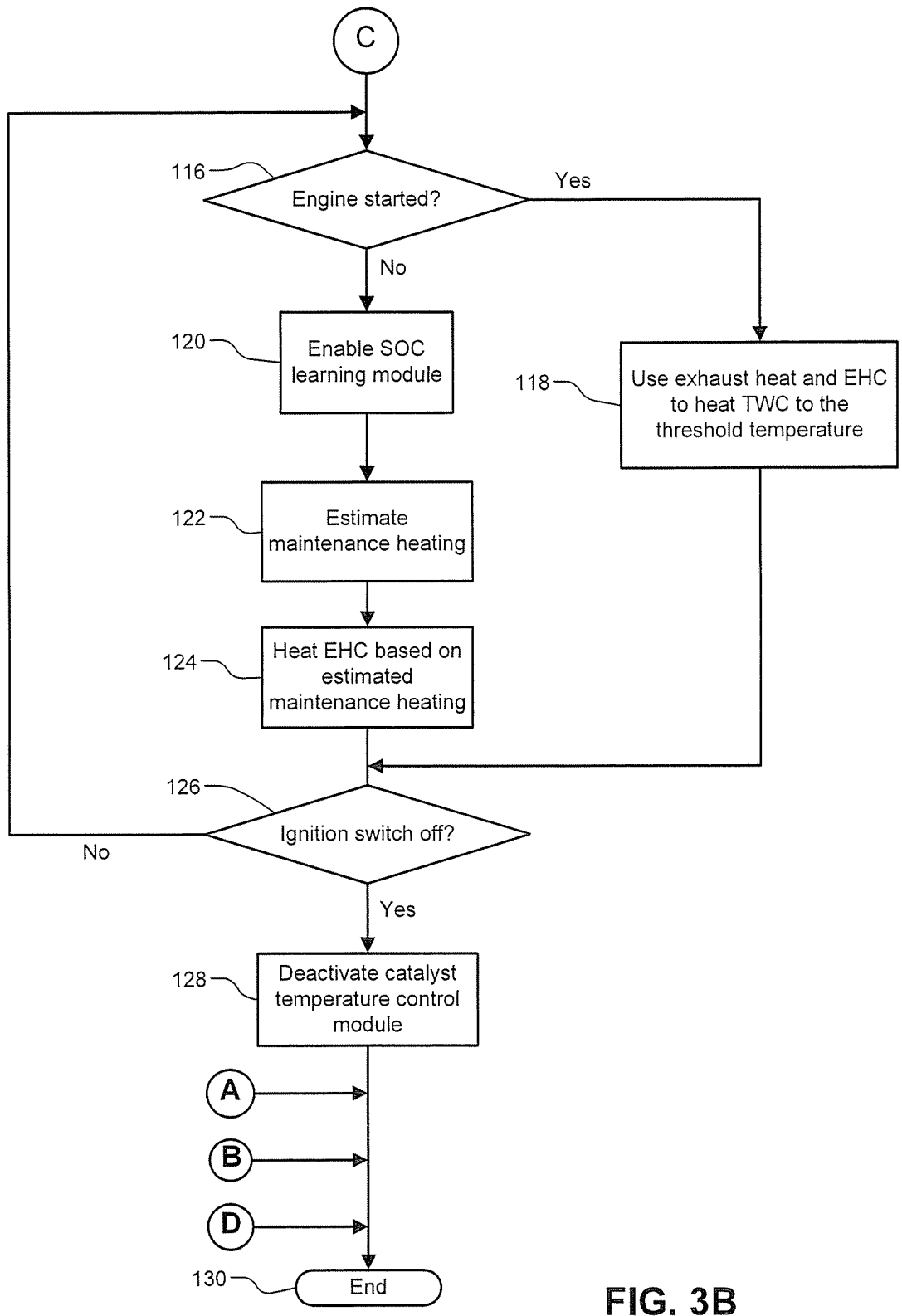
Figure 3C:
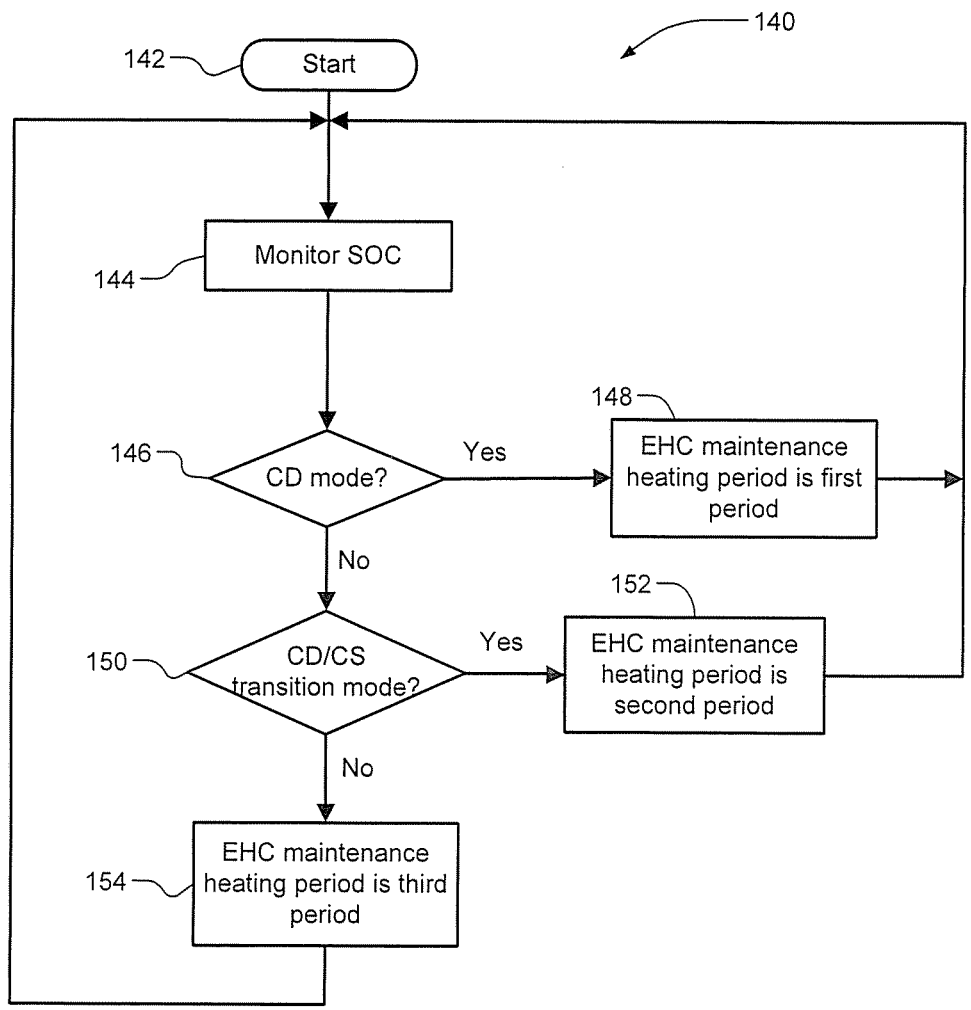

Referring now to FIGS. 3A, 3B and 3C, a method 80 of controlling the temperature of the catalytic converter starts in step 82. The vehicle start anticipation module 44 determines whether a vehicle start is anticipated by monitoring the vehicle conditions in step 84. When the vehicle start is anticipated in step 84, the battery status determination module 50 determines whether the SOC of the battery is near a CS mode in step 86. When the SOC is near the CS mode, the EHC control module 52 deactivates the EHC 34 in step 88. The catalyst temperature control module 42 determines that when the engine 12 is started, the TWC 32 is heated solely by the exhaust gas in step 90.

When the SOC of the battery 24 is not near the CS mode in step 86, the vehicle start anticipation module 44 determines whether a remote start is activated in step 92. If the remote start is activated in step 92, the method 80 ends in step 130. The catalyst temperature control for a vehicle start by a remote controller is disclosed in a co-pending U.S. application Ser. No. 12/392,438, (General Motors No. P006793-PTH-RRM), assigned to the present assignee, and is not covered by the present disclosure.

If the remote start is not activated in step 92, the heat output estimation module 48 determines whether the catalyst temperature (i.e., temperature of the TWC 32) is below a threshold temperature (e.g., the light-off temperature) in step 94. When the catalyst temperature is not below the threshold temperature in step 94, the method 80 goes to step 116. When the catalyst temperature is below the threshold temperature, the silent start monitoring module 46 determines whether the vehicle 10 is in a silent start capable condition in step 96. When the vehicle 10 is in a silent start capable condition in step 96, the engine 12 will not be started immediately to heat the TWC 32 after the ignition switch 60 is turned on. The EHC 34 is powered to a first preheating temperature (for example, 100° C.) using hybrid battery in step 98.

The vehicle start anticipation module 44 continuously monitors the vehicle condition until the ignition switch 60 is turned on. When the vehicle start anticipation module 44 receives a signal from the proximity sensor 54 indicative of presence of a driver in the driver's seat in step 100, the EHC 34 is powered to a second preheating temperature (for example, 300° C.) to provide a higher heat output in step 102.

When the vehicle 10 is not in a silent start capable condition in step 96, the engine 12 will be started immediately after the ignition switch 60 is turned on. The EHC 34 is powered to the second temperature to provide a higher heat output in step 102.

When the driver's presence is not detected in step 100, the vehicle start anticipation module 44 determines whether the key is inserted in the ignition switch 60 in step 104. If the key is in the ignition switch 60 in step 104, the method 80 goes to step 102 and the EHC 34 is powered to the second temperature to provide a higher heat output. If the key is not inserted in the ignition switch 60 in step 104, the catalyst temperature control module 42 waits for a first predetermined time (for example only, 3 minutes) for further response from the driver in step 106. If the vehicle start anticipation module 44 receives a signal from the door lock controller 56 indicative of a door lock request in step 108, the EHC control module 52 deactivates the EHC 34 in step 112. If no signal indicative of the door lock request is received in step 108, the vehicle start anticipation module 44 continues to monitor the vehicle conditions. When a driver's further response is not received within a second predetermined time in step 110, the method 80 goes to step 112 to deactivate the EHC 34.

Returning to step 102, after the EHC 34 is powered to the second preheating temperature to provide a higher heat output due to detection of a driver's presence in the vehicle, the vehicle start anticipation module 44 continues to monitor whether the ignition switch 60 is turned on in step 116. If the ignition switch 60 is not turned on in step 116, the method 80 goes to step 106 to wait for further response from the driver. If the ignition switch 60 is turned on in step 114, the method 80 goes to step 116.

When the engine 12 is started in step 116, the heat output estimation module 48 determines that heating of the TWC 32 is conducted by the engine 12 and the EHC 34 with full power in step 118. The method 80 then goes to step 126. When the engine 12 is not started in step 116, the maintenance heating estimation module 64 enables the SOC learning module 66 in step 120. The SOC learning module 66 estimates the maintenance heat output in step 122. The EHC control module 52 controls the EHC 34 to provide the desired maintenance heat in step 124.

The vehicle start anticipation module 44 continues to determine whether the ignition switch 60 is turned off in step 126. If the ignition switch 60 is not turned off in step 126, the method 80 goes back to step 116. When ignition switch 60 is turned off in step 126, the catalyst temperature control module 42 is deactivated in step 128. The method 80 ends in step 130.

Referring to FIG. 3C, the method 140 for determining maintenance heating by the SOC learning module 66 starts in step 142. In step 144, the battery status determination module 50 monitors the SOC in step 144. When the vehicle 10 is in the CD mode in step 146, the maintenance heating estimation module 64 estimates a first maintenance heat output that corresponds to a first maintenance heating period in step 148. When the vehicle 10 is not in the CD mode in step 146, the battery status determination module 50 determines whether the vehicle is in the CD/CS transition mode in step 150. If the vehicle 10 is in the CD/CS transition mode, the maintenance heating estimation module 64 estimates a second maintenance heat output that corresponds to a second maintenance heating period in step 152. When the vehicle 10 is not in the CD/CS mode, the vehicle 10 is in the CS mode. The maintenance heating estimation module 64 estimates a third maintenance heat output that corresponds to a third maintenance heating period in step 154. The first maintenance heat output is greater than the second maintenance heat output and the second maintenance heat output is greater than the third maintenance heat output. The first maintenance heating period is longer than the second maintenance heating period. The second maintenance heating period is longer than the third maintenance heating period. The method 140 returns to step 144 to continuously monitor the SOC.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A catalyst temperature control system comprising:
  a battery state of charge determination module that determines a state of charge (SOC) of a battery;
  an electrically heated catalyst (EHC) control module that activates an EHC based on the SOC and based on a determination of whether a vehicle start is anticipated; and
  a vehicle start anticipation module that determines whether the vehicle start is anticipated by sensing at least one of a plurality of conditions before an ignition switch of a vehicle is turned on,
  wherein the plurality of conditions include a status of doors of the vehicle, a status of door locks, a status of a trunk of the vehicle, presence of a person in the vehicle, detection of a key fob for the vehicle, and insertion of a key in the ignition switch,
  wherein the at least one of the plurality of conditions includes the status of the door locks and presence of the person,
  wherein when one of the doors of the vehicle is unlocked and presence of the person in the vehicle are not detected, the EHC control module selects a first preheating output for the EHC, and
  wherein when presence of the person in the vehicle is detected, the EHC control module selects a second preheating output for the EHC that is higher than the first preheating output.

2. The temperature control system of claim 1 further comprising a heat output estimation module that estimates a desired preheating output of the EHC based on the at least one of the plurality of conditions.

3. The catalyst temperature control system of claim 1 wherein the EHC control module deactivates the EHC when the SOC is near a charge sustaining mode.

4. The catalyst temperature control system of claim 1 wherein the EHC control module activates the EHC when the SOC is in a charge depleting mode.

5. The catalyst temperature control system of claim 1 further comprising a heat output estimation module that estimates a desired maintenance heat output of the EHC based on the SOC.

6. The catalyst temperature control system of claim 5 wherein the maintenance heat output maintains a catalytic converter at or above a predetermined temperature after a vehicle start.

7. A method of controlling catalyst temperature comprising:
  determining a state of charge (SOC) of a battery;
  activating an electrically heated catalyst (EHC) based on the SOC and based on a determination of whether a vehicle start is anticipate;
  determining whether the vehicle start is anticipated based on at least one of a plurality of conditions before an ignition switch of a vehicle is turned on, wherein the plurality of conditions include a status of doors of the vehicle, a status of door locks, a status of a trunk of the vehicle, presence of a person in the vehicle, detection of a key fob for the vehicle, and insertion of a key in the ignition switch, and wherein the at least one the plurality of conditions includes the status of the door locks and presence of the person;

selecting a first heat output for the EHC when the door lock is unlocked and presence of the person in the vehicle is not detected; and selecting a second heat output for the EHC when presence of the person in the vehicle is detected, wherein the second heat output is higher than the first heat output.

8. The method of claim 7 further comprising estimating a desired heat output of the EHC based on the conditions.

9. The method of claim 7 further comprising activating the EHC when the SOC is in a charge depleting mode.

10. The method of claim 7 further comprising estimating a desired heat output of the EHC based on the SOC.

11. A system comprising:

an electronic control module including logic to execute instructions that:

determine a state of charge (SOC) of a battery;

activate an EHC based on the SOC and based on a determination of whether a vehicle start is anticipated; and determine whether the vehicle start is anticipated by sensing at least one of a plurality of conditions before an ignition switch of a vehicle is turned on, wherein the plurality of conditions include a status of doors of the vehicle, a status of door locks, a status of a trunk of the vehicle, presence of a person in the vehicle, detection of a key fob for the vehicle, and insertion of a key in the ignition switch, wherein the at least one of the plurality of conditions includes the status of the door locks and presence of the person, wherein when one of the doors of the vehicle is unlocked and presence of the person in the vehicle are not detected, the electronic control module selects a first preheating output for the EHC, and wherein when presence of the person in the vehicle is detected, the electronic control module selects a second preheating output for the EHC that is higher than the first preheating output.

* * * * *